United States Patent [19]

Dunbar

[11] 4,425,071

[45] Jan. 10, 1984

[54] APPARATUS FOR LOADING AND UNLOADING CARGO FROM A TRAILER

[76] Inventor: Glenn G. Dunbar, Dunbar Manufacturing, 2608 Overbrook, Toledo, Ohio 43614

[21] Appl. No.: 226,950

[22] Filed: Jan. 21, 1981

[51] Int. Cl.³ ............................ B60P 1/00; B60P 1/54
[52] U.S. Cl. .................................. 414/542; 191/12 R; 212/217
[58] Field of Search ................ 414/542; 212/217, 216, 212/205; 191/12 R

[56] References Cited

U.S. PATENT DOCUMENTS

| | | | |
|---|---|---|---|
| 1,124,217 | 1/1915 | Emery | 414/542 |
| 2,428,144 | 9/1947 | Clough . | |
| 2,730,249 | 1/1956 | Edwards | 414/542 |
| 2,778,512 | 1/1957 | Strona | 414/542 |
| 2,892,389 | 6/1959 | Schurger et al. | 191/12 R |
| 2,935,080 | 5/1960 | Klimek | 191/12 R |
| 3,006,485 | 10/1961 | Martin . | |
| 3,006,486 | 10/1961 | Cook et al. | 414/542 |
| 3,233,364 | 2/1966 | Lahr | 191/12 R X |
| 3,412,876 | 11/1968 | Calabrese | 212/205 X |
| 3,448,875 | 6/1969 | Robinson | 414/542 |
| 3,540,380 | 11/1970 | Tumpak et al. | 104/246 |
| 3,700,833 | 10/1972 | Behme | 191/12 R |
| 3,738,501 | 6/1973 | Gill | 212/217 X |
| 4,187,048 | 2/1980 | Bohlmann | 414/542 |

OTHER PUBLICATIONS

"Cargo Master" Brochure, Wayne Engineering Corp., Cedar Falls, Iowa, Form No. 12-71-10, (pp. 1-8).

Primary Examiner—Bruce H. Stoner, Jr.
Attorney, Agent, or Firm—Emch, Schaffer & Schaub Co.

[57] ABSTRACT

Material handling apparatus for a trailer having opposed sidewalls is disclosed in the application. Support brackets are positioned on the opposed sidewalls of the trailer. A frame is moveably positioned on the support brackets. The frame is capable of moving said support brackets in a direction that is substantially parallel to the sidewalls of the trailer. A lifting frame is moveably positioned on the frame. A hoist is positioned on the lifting frame and the hoist is capable of moving in a direction substantially parallel to and substantially perpendicular to the opposed sidewalls of the trailer. The hoist is capable of lifting objects that are to be transported in the trailer whereby said objects are lifted and said lifting frame, hoist and frame can be moved with respect to said trailer for loading and unloading the objects.

27 Claims, 10 Drawing Figures

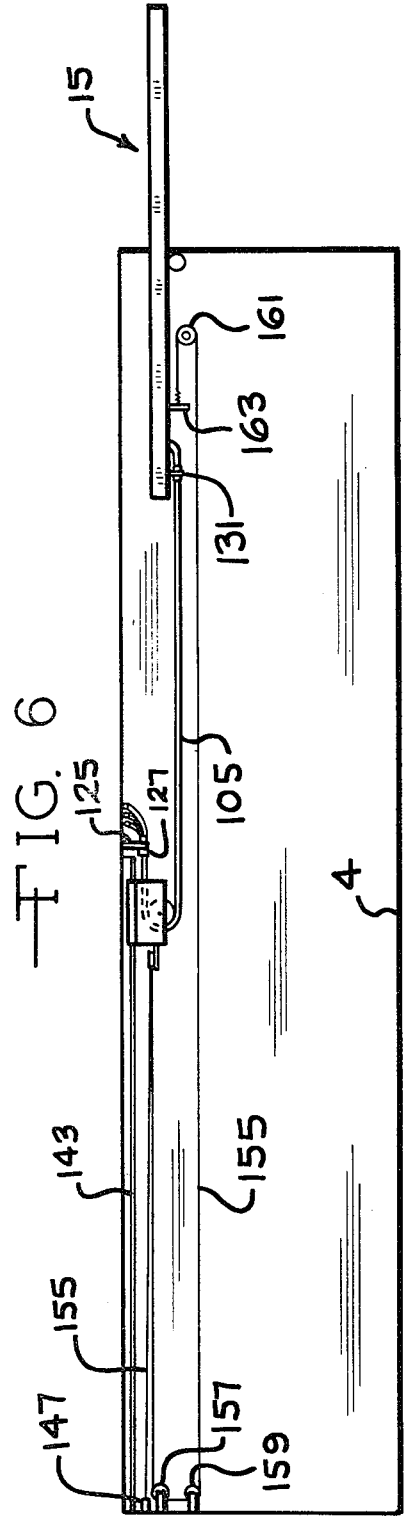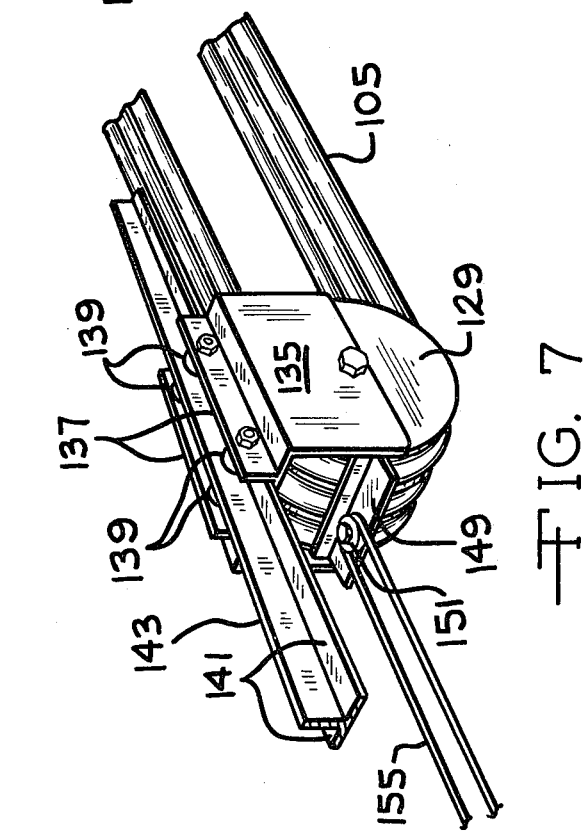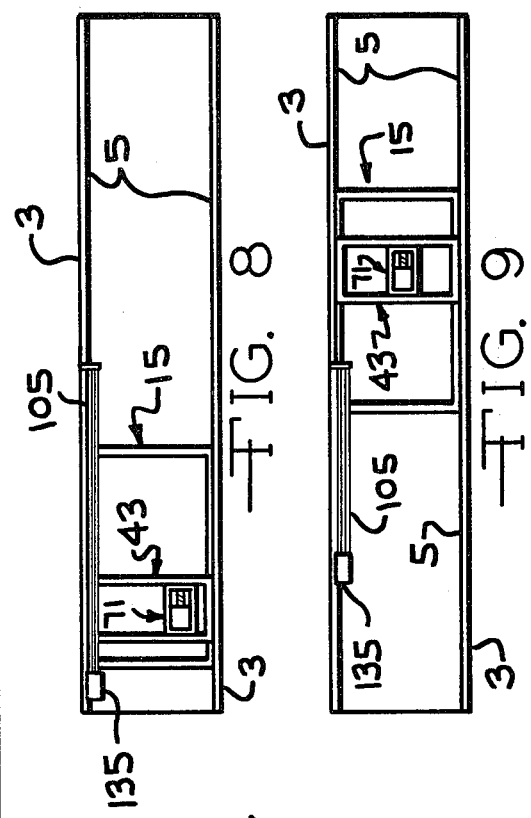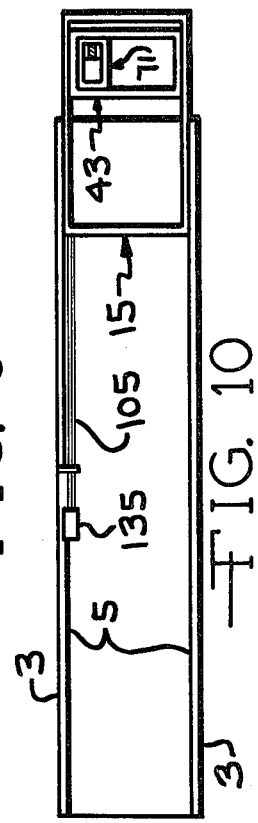

APPARATUS FOR LOADING AND UNLOADING CARGO FROM A TRAILER

BACKGROUND OF THE INVENTION

This invention is directed to a weight transfer apparatus for providing a means of loading and unloading test weights from a standard truck onto a scale testing vehicle or the ground. Specifically the weight transfer apparatus is telescopingly positioned in the truck to allow the weight transfer apparatus to position items in the truck. When the weight transfer apparatus is not being used it will be carried in the interior of the truck.

There are primarily two types of prior art cargo transfer mechanisms. One device is a swing-style crank mounted on a post located in the center of the truck bed. This crane is commonly used with trucks that carry loads of bricks and other construction materials. One disadvantage of this device is that the center post eliminates space for storage and obstructs the flow of positioning of materials on the truck bed. A second disadvantage relates to the necessary lack of side walls in the cargo compartment to allow the crane to swing around the perimeter of the truck bed. Other models of the swing crane version have the center post located at the front or the rear of the cargo bed, however, the above disadvantages remain.

The other type of cargo transfer device is a hoist which rides upon rails fixed to the side walls of the hollow compartment of a trailer. A pair of extension swing booms are pivotally fixed to the rearward end of the rear cargo compartment in such a manner that they can be swung to extend the rail lengths to the exterior of the truck. The extended rail lengths then allow the hoist to move the exterior of the rearward portion of the rear cargo compartment. A major disadvantage with this device relates to the swing boom and the fixation to the rear of the truck. The swing booms, when not in operation, must be folded across the rear of the truck, or if the rear of the cargo compartment has doors, be folded to a position within the cargo compartment. This eliminates potential cargo space.

The present invention will eliminate the disadvantages mentioned above. The supporting frame fits adjacent the side walls of the rear cargo compartment. All moving parts of the invention are adjacent the ceiling of the rear cargo compartment, thereby providing access to the entire bed and storage area within the cargo compartment. The telescoping carriage mechanism is integrally connected with the hoist.

SUMMARY OF THE INVENTION

The invention relates to a material handling apparatus for a trailer having opposed sidewalls where support brackets are positioned on the opposed sidewalls of the trailer. A frame is moveably positioned on the support brackets. The frame is capable of moving said support brackets in a direction that is substantially parallel to the sidewalls of the trailer. A lifting means is moveably positioned on the frame. The lifting means is capable of moving in a direction substantially parallel to and substantially perpendicular to the opposed sidewalls of the trailer. The lifting means is capable of lifting objects that are to be transported in the trailer whereby said objects are lifted and said lifting means and frame can be moved with respect to said trailer for loading and unloading the objects.

DESCRIPTION OF THE DRAWINGS

FIG. 6 is a side elevational view of the weight transfer apparatus positioned in a trailer;

FIG. 7 is a perspective view of one portion of the present invention;

FIG. 8 is a plan view of the invention with the weight transfer apparatus in one location in the trailer;

FIG. 9 is a plan view of the invention with the weight transfer apparatus in another position with respect to the trailer; and FIG. 10 is a plan view of the invention with the weight transfer apparatus in a different position with respect to the trailer.

DESCRIPTION OF THE EMBODIMENTS

Figure 1:
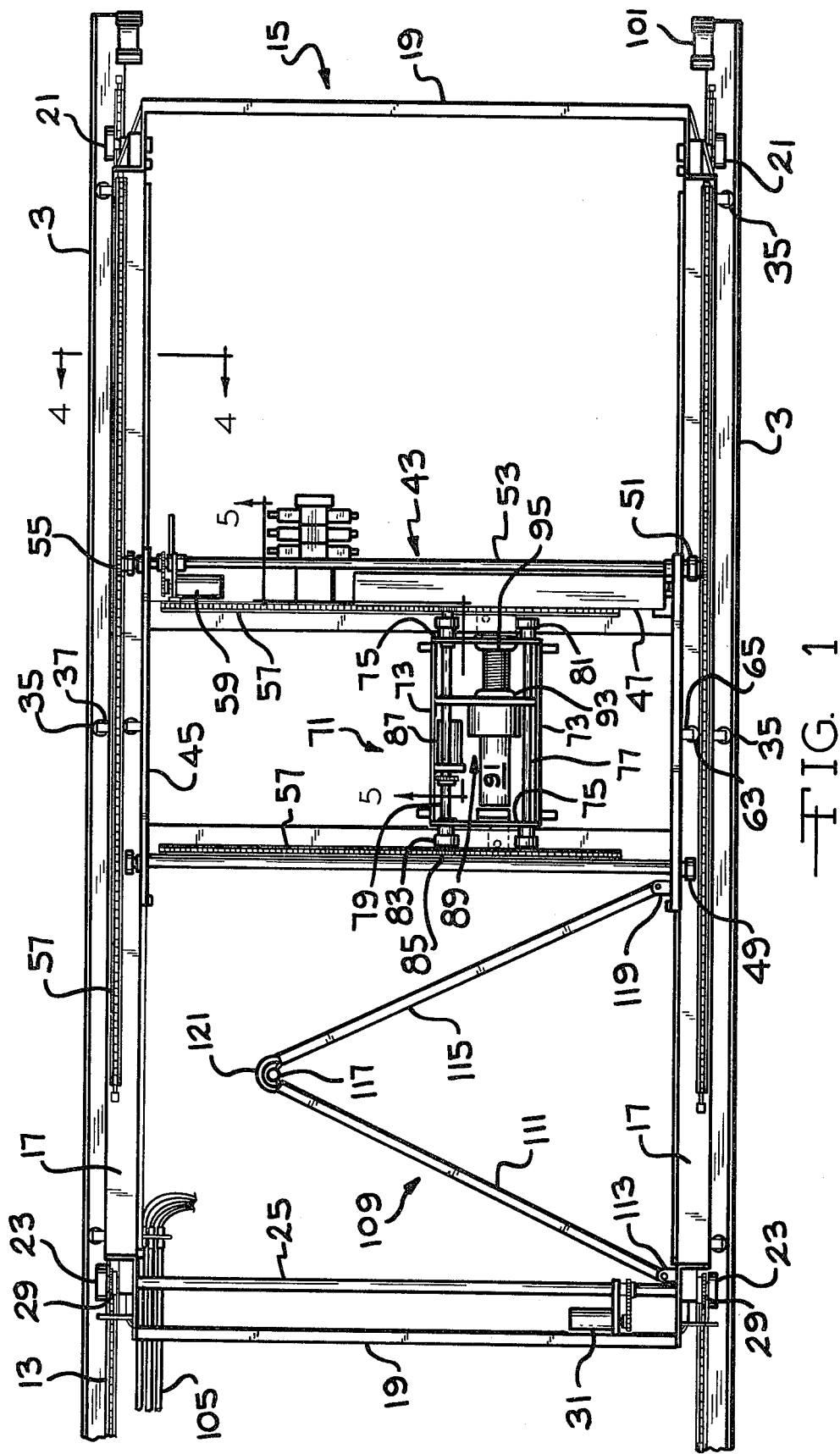
FIG. 1 is a plan view of the weight transfer apparatus of the present invention.
Figure 2:
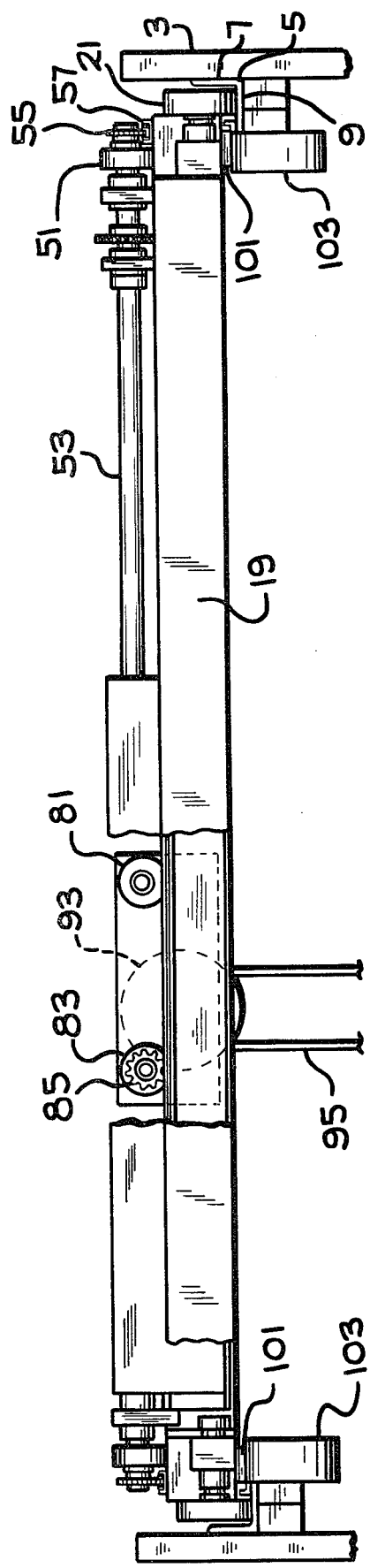
FIG. 2 is an end elevational view of the weight transfer apparatus with a partially broken away portion.
Figure 3:
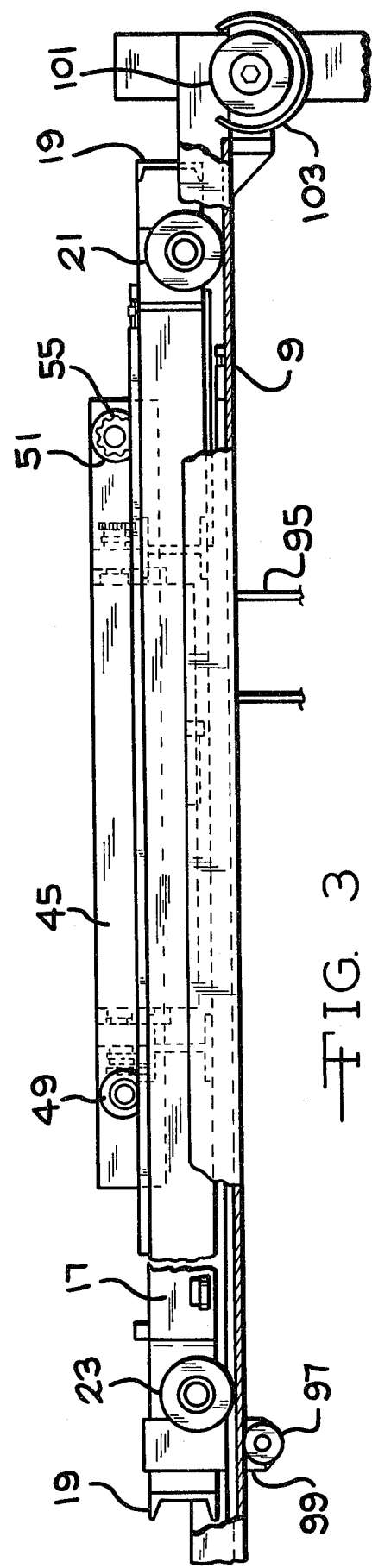
FIG. 3 is a side elevational view of the weight transfer apparatus with a partially broken away portion.
Figure 4:
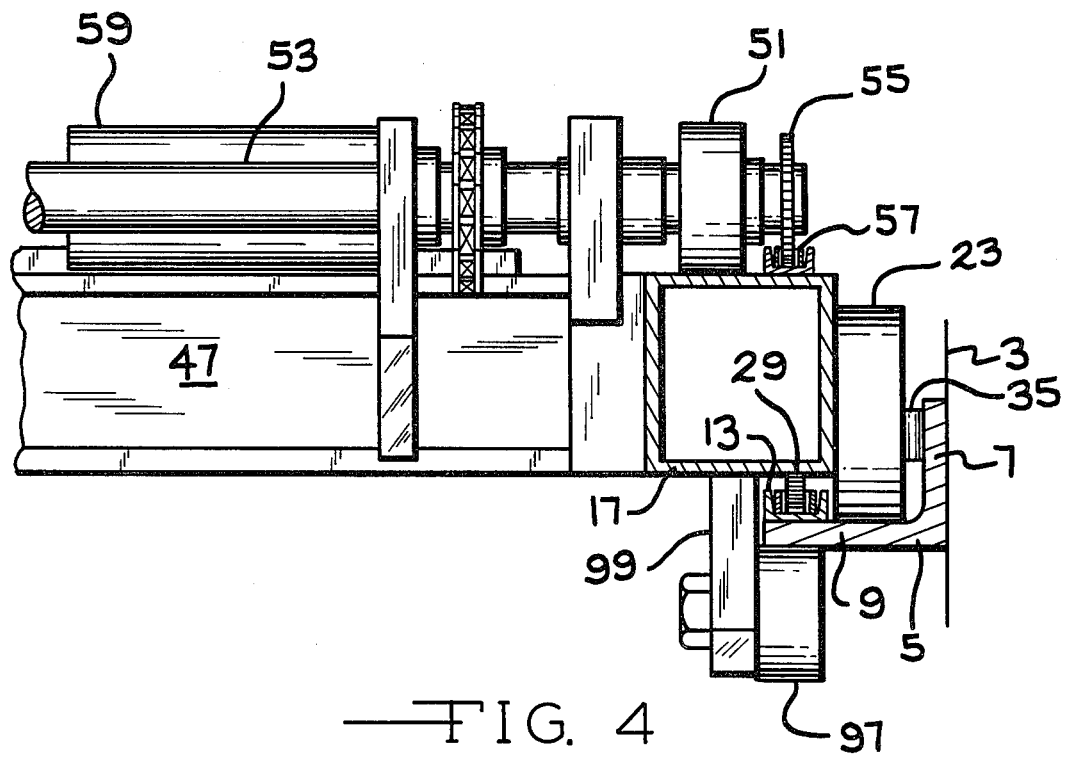
FIG. 4 is a cross sectional view of the invention taken along line 4—4 in FIG. 1.
Figure 5:
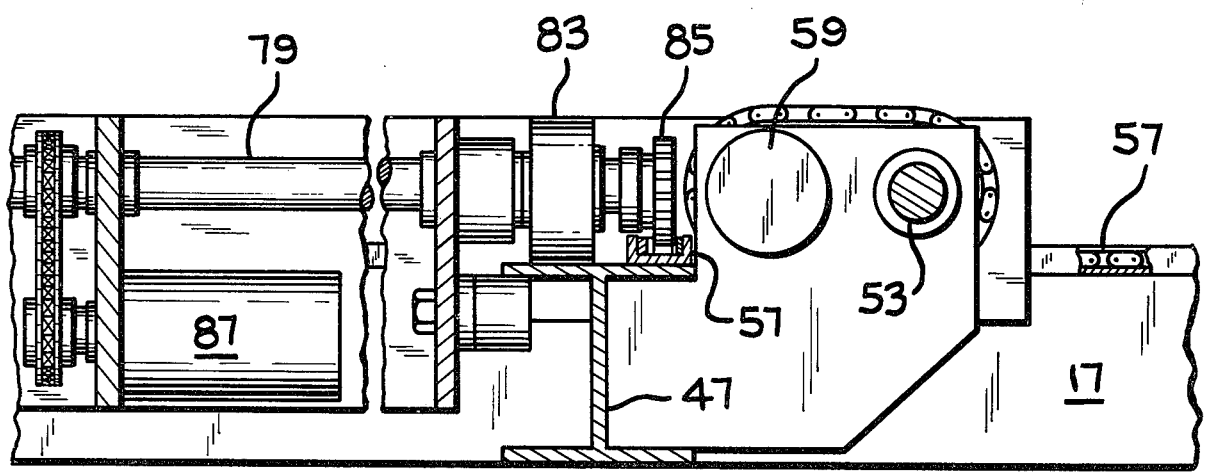
FIG. 5 is a cross sectional view of the invention taken along line 5—5 in FIG. 1.

The present invention relates to a weight transfer apparatus for use in a trailer having opposed side walls. More particularly the weight transfer apparatus has a frame that is moveable with respect to the sidewalls of the trailer and a lifting means movably positioned on the frame. By utilizing the weight transfer apparatus objects can be lifted and placed in various positions with respect to the trailer during the loading and unloading of the trailer. The weight transfer apparatus is particularly well suited for providing means for loading and unloading test weights from a standard truck onto a scale testing vehicle or other suitable location.

The details of the invention will be more readily understood by referring to the attached drawings in connection with the following description.

The trailer has opposed sidewalls 3 and a floor 4. The trailer will also normally have a roof. Generally L-shaped support brackets 5 are positioned on the sidewalls 3 of the trailer. The first leg 7 of the bracket 5 is positioned in contact with the sidewall 3 of the trailer and secured to the sidewall. The second leg 9 extends into the interior of the trailer in a direction that is substantially perpendicular to the sidewalls 3 of the trailer. The support brackets are positioned in substantially opposed relationship and substantially the same distance from the floor of the trailer. The second legs 9 of the brackets 5 are positioned to be substantially parallel to the floor of the trailer. A longitudinal track 13 is positioned on the second leg 9 so that the track extends substantially parallel to the sidewalls 3 of the trailer. The track 13 is positioned adjacent the end of the second leg 9 that is spaced apart from the sidewalls 3. The track is also positioned on the surface of the second leg 9 that does not face the floor of the trailer.

A frame 15 having longitudinal side members 17 and transverse members 19 connected to the side members 17 is positioned in the interior of the trailer. The side members 17 are positioned so that they are substantially parallel to the sidewalls 3 of the trailer and the end members 19 are positioned substantially perpendicular to the sidewalls 3 of the trailer. Rollers 21 are rotatably connected to the side members 17 on the end of frame 15 that is facing the door or discharge end of the trailer. Driven rollers 23 are positioned on the side members 17 at the opposite end of the frame 15. The rollers 23 are positioned on a drive shaft 25 that passes through the side members 17. The drive shaft 25 is positioned so that it is substantially perpendicular to the side members 17. The rollers 21 and driven rollers 23 are positioned in substantially the same position with respect to the side members 17. The rollers 21 and driven rollers 23 are positioned so that they will engage the second leg 9 of the bracket 5. The rollers 21 and driven rollers 23 engage the surface of the second leg 9 where the longitudinal track 13 is positioned. The rollers are positioned so that they are between the longitudinal track 13 and the first leg 7 of the bracket 5. The second leg 9 of the bracket 5 provides a support surface which supports the rollers and frame 15. The frame 15 is maintained in a substantially level position that is substantially parallel to the floor of the trailer by the bracket 5.

A drive sprocket 29 is positioned on each end of the drive shaft 25 adjacent the driven rollers 23. The drive sprockets 29 are positioned so that they will engage the longitudinal track 13 positioned on the second leg 9 of the bracket 5.

Positioned adjacent the drive shaft 25 is a reversable hydraulic drive motor 31. The drive motor 31 is operatively connected to the drive shaft 25 so that the drive motor is capable of rotating the drive shaft. The drive motor 31 is connected to a suitable source of hydraulic fluid for driving the motor.

Positioned along the side members 17 are a plurality of spacer rollers 35. The spacer rollers are connected to support members 37 that are connected to the longitudinal side members 17. The spacer rollers 35 rotatably engage the first leg 7 of the bracket 5 and act to maintain the proper spaced relationship between the frame 15, the first leg 7 and the side walls 3.

A lifting frame 43 is positioned in the interior of the trailer and is supported by the frame 15. The lifting frame 43 has side members 45 and transverse end members 47. Rollers 49 are positioned at one end of the side members 45 and driven rollers 51 are positioned at the other end of the side members 45. The driven rollers 51 are mounted on a drive shaft 53 that extends between the side members 45. The rollers 49 and driven rollers 51 are positioned so that they will engage the longitudinal side members 17 of the frame 15.

Also positioned on the drive shaft 53 are drive sprockets 55. The drive sprockets are positioned at the end of the drive shaft 53 adjacent the side of the driven rollers 51 that face the sidewalls 3 of the trailer. The drive sprockets 55 engage the longitudinal tracks 57 which are positioned on the side members 17 of the frame 15. A drive motor 59 is positioned adjacent the drive shaft 53. The drive motor 59 is operatively connected to the drive shaft 53 for rotating the drive shaft.

On each side of the lifting frame 43 are spacer rollers 63. The spacer rollers are mounted on a support member 65 that is connected to the side members 45 of the frame 43. The spacer rollers 63 are positioned so that they rotatably engage the longitduinal track 57 located on the side members 17 of the frame 15. The spacer rollers 63 act to maintain the proper spaced relationship between the lifting frame 43 and the frame 15.

A lifting means 71 is positioned on the lifting frame 43. The lifting means 71 has an outer frame having side members 73 and end members 75. A support shaft 77 and drive shaft 79 are positioned between and extend beyond the end members 75. Rotatably positioned on the support shaft 77 are rollers 81. The rollers are positioned on the portion of the support shaft 77 that extend beyond the end members 75. Drive rollers 83 and drive sprockets 85 are positioned on the ends of the drive shaft 75 that extend beyond the end members 75. The rollers 81 and drive rollers 83 are positioned so that they engage the end members 47 of the lifting frame 43. The drive sprockets 85 are positioned so that they engage the longitudinal tracks 57 positioned on the end members 47. Thus, the lifting means 71 is moveably supported on the end members 47 of the lifting frame 43.

Positioned adjacent the drive shaft 79 is a reversable drive motor 87. The drive motor 87 is operatively connected to the drive shaft 79 for causing the drive shaft to rotate.

Positioned in the lifting means between the end members 75 is a hoist 89. The hoist has a drive motor 91 and a rotatable drum 93 that is driven by the drive motor. A cable 95 is positioned around the rotatable drum 93 so that the cable can be advanced by the rotation of the drum. The hoist 89 is positioned on the lifting means 71 so that the hoist will move as the lifting means is moved with respect to the floor of the trailer.

Positioned on one end of the longitudinal side member 17 of the frame 15 are balance rollers 97. The balance rollers are rotatably supported on a flange 99 that is connected to the side members 17 of the frame 15. The balance rollers 97 are positioned so that they engage the second leg 9 of the support bracket 5. The balance rollers engage the surface of the second leg 9 that is opposite to the surface that is engaged by rollers 21 and driven rollers 23 that are positioned on the frame 15. Accordingly, the balance rollers 97 engage the opposite surface of the second leg 9 from the other rollers connected to the frame 15. The balance rollers 97 are positioned adjacent driven rollers 23 on the end of the frame 15 that is closest to the front or enclosed end wall of the trailer.

Positioned on the side walls 3 of the trailer are support rollers 101. The support rollers are rotatably secured to the sidewalls 3 by any suitable securement means. A guard 103 is positioned around a substantial portion of the periphery of the support rollers. The support rollers 101 are positioned on the sidewalls 3 so that the rollers will be in position to engage the side member 17 of the frame 15 as the frame moves towards the door or opening from the trailer. The guard 103 is designed so that a portion of the support rollers 101 will be open and in position to receive the side members 17. Thus, the support rollers 101 will be in position to provide additional support for the frame 15 as it advances towards and extends beyond the open end of the trailer.

FIGS. 8, 9 and 10 show other positions that can be assumed by the lifting means of this invention. In FIG. 8 the frame 15 and lifting frame 43 are positioned substantially adjacent to the rear wall or enclosed end of the trailer. The lifting means 71 is also positioned at one side of the lifting frame 43 adjacent one side of the lifting frame. In FIG. 9 the frame 15 and lifting frame 43 have been advanced along the support bracket 5 to approximately the midpoint of the trailer. The lifting frame 43 is positioned approximately in the center of the frame 15. The lifting means 71 is also positioned substantially in the center of the lifting frame 43. In FIG. 10 the frame 15 has been positioned at substantially the maximum extended position at the open end of the trailer. In this position a portion of the frame 15 extends beyond the end of the trailer. The lifting means 71 has been advanced along the lifting frame so that it is adjacent one side of the lifting frame 43. In the position shown in FIG. 10 the lifting means 71 will be able to unload items from the end of the trailer or engage the items positioned outside the trailer and lift them for transporting into the trailer.

To operate the weight transfer apparatus of the present invention it is necessary to energize the drive motor 31 on the frame 15, the drive motor 59 on the lifting frame 43 and the drive motor 87 on the lifting means 71. In the embodiment shown hydraulic motors have been used for these purposes and it is, accordingly, necessary to supply hydraulic fluid to operate these motors. As shown in FIG. 1 a plurality of hydraulic lines 105 are connected to the frame 15 to supply hydraulic fluid to the motors. The hydraulic lines are connected to the drive motors in a conventional manner and this connection is not shown in detail in the drawings. However, the connections for the hydraulic drive motors on the lifting frame 43 and lifting means 71 must be somewhat flexible as the lifting frame 43 moves with respect to the frame 15. To accomplish this flexible connection a linkage 109 is pivotally connected to the frame 15 and the lifting frame 43. The linkage 109 has a first hollow member 111 that is pivotally connected to the frame 15 at bracket 113. The bracket 113 is connected to the side members 17 of the frame 15. A second hollow member 115 is pivotally connected to the first hollow member 111 at pivot connection 117. The second hollow member 115 is connected to bracket 119 on the lifting frame 43. The first and second hollow members are positioned so that a hydraulic line 121 can be positioned in the hollow members to operatively connect the hydraulic line between the frame 15 and the lifting frame 43. The hydraulic line 121 passes around the pivot connection 117 where the first and second hollow members are pivotally connected. The linkage 109 provides a means for carrying the hydraulic lines to allow for movement between the frame 15 and the lifting frame 43. The linkage also maintains the hydraulic line in a position where the line can not interfere with the movement of the frame 15 and lifting frame 43.

The hydraulic lines 105 shown connected to the frame 15 must also be flexibly connected to the frame 15 as the frame moves with respect to the sidewalls of the trailer. As shown in FIGS. 6 and 7 the hydraulic lines enter the trailer and are connected to a support flange 125. The support flange 125 contains an opening through which the hydraulic lines 105 pass. A clamp 127 is positioned adjacent to the aperture to secure the hydraulic lines to the support flange. The hydraulic lines extend from the support flange, pass around a plurality of pulleys 129 and are connected to the frame 15. A support bracket 131 is positioned on the frame 15 and the hydraulic lines 105 are secured to the support bracket. From the support bracket 131 the hydraulic lines are connected to the various drive motors in a conventional manner.

The plurality of pulleys 129 are rotatably positioned in a mounting bracket 135. On the top of the mounting bracket there are two opposed flanges 137 and rollers 139 are rotatably secured to the flanges 137. The rollers are positioned so that they will rotatably engage the support surfaces 141 on the track 143. The rollers 139 are designed so they are moveably positioned on the track 143. The track 143 is secured to the sidewall 3 of the trailer. A plate 149 is positioned between the sides of the mounting bracket 135 for the pulleys 129. The plate extends across one end of the pulleys. Positioned on the plate 149 is a rotatable pulley 151.

A connection bracket 147 is positioned on the end wall of the trailer. A line 155 is connected to the connection bracket. The line extends from the connection bracket around the pulley 151 on the plate 149 of the mounting bracket 135 for the pulleys 129. The line passes around the pulley 151 and passes around pulley 157 and pulley 159 that are connecmted to the end wall of the trailer. From the pulley 159 the line extends to pulley 161 that is located on the sidewall 3 of the trailer adjacent the open end of the trailer. The line passes around the pulley 161 and connects to bracket 163 on the frame 15.

The operation of the weight transfer apparatus will be more readily understood by referring to the attached drawings in connection with the following description.

In operation the weight transfer apparatus must be positioned in the proper location in the trailer for lifting and transporting items that are carried by the trailer. Accordingly, the frame 15, lifting frame 43 and lifting means 71 must be properly positioned so that an object can be engaged and properly positioned. The frame 15 is positioned in the trailer by engaging drive motor 31 to rotate drive shaft 25. The rotation of drive shaft 25 will cause driven rollers 23 and drive sprocket 29 to rotate. The rotation of the drive sprocket 29 will cause the drive sprocket to advance along longitudinal track 13 positioned on the second leg 9 of the support bracket 5. As the drive sprocket 29 advances along the track 13 the frame 15 will also be caused to advance in the same direction with respect to the walls 3 of the trailer. The driven rollers 23 also engage the second leg 9 of the support bracket 5. The rotation of the driven rollers 23 will also assist in causing the frame 15 to move with respect to the sidewall 3 of the trailer. The rollers 21 located at the other end of the frame 15 also engage the second leg 9 of the support bracket 5. Accordingly, as the frame 15 moves along the surface of the second leg 9 the rollers 21 will also move along the second leg 9. The drive motor 31 is reversible and is capable of rotating the drive shaft 25 so that the drive sprocket 29 and driven rollers 23 can be positioned at substantially any point along the track 13 and the second leg 9 of the bracket 5. Therefore, the frame 15 can be positioned in the desired location with respect to the side walls 3 of the trailer.

When the frame 15 is properly positioned the lifting frame 43 can be positioned in the desired location. The lifting frame 43 is supported on rollers 49 and driven rollers 51. The rollers 49 and driven rollers 51 are supported on the longitudinal side members 17 of the frame 15. The driven rollers 51 and drive sprockets 55 are connected to drive shaft 53. The drive sprockets 55 engage longitudinal tracks 57 positioned on the side members 17 of the frame 15. A drive motor 59 is operatively connected to the drive shaft 53. The drive motor 59 is reversible and can cause the drive shaft 53 to rotate in either direction. The rotation of the drive shaft 53 will cause the drive sprockets 55 to advance along the longitudinal tracks 57 and the driven rollers 51 to advance along the side members 17. Thus, the lifting frame 43 can be positioned in select locations along the length of the frame 15.

The lifting means 71 positioned on the lifting frame 43 is supported on rollers 81 and driven rollers 83. The rollers 81 and driven rollers 83 engage and are supported by the transverse end members 47 of the lifting frame. The driven rollers 83 are positioned on drive shaft 79. Also positioned on the drive shaft 79 are drive sprockets 85. The drive sprockets 85 engage the longitudinal tracks 57 located on the end members 47 of the lifting frame 43. A drive motor 87 is operatively connected to the drive shaft 79 for causing the drive shaft to rotate. The drive motor 87 is reversible and can cause the drive shaft to rotate in either direction. Rotation of the drive shaft will cause the drive sprockets 85 to advance along the tracks 57 and the driven rollers 83 to also advance along the end members. Thus, the lifting means 71 can be positioned at various locations between the side members 17 of the frame 15 by activating the drive motor 87. When the lifting means 71 is in the desired location the hoist 89 can be used to raise or lower objects to be loaded into or unloaded from the trailer. The hoist 89 has a rotatable drum 93 upon which a length of cable 95 is positioned. A reversible drive motor 91 can be activated to cause cable 95 to be advanced from or to be taken up upon the rotatable drum 93.

FIGS. 8, 9 and 10 give an example of the range of movement that is possible with the weight transfer apparatus. In FIG. 8 the frame 15 is positioned at substantially one end of its range of movement adjacent the front wall of the trailer. The lifting frame 43 is positioned towards the end of the frame 15 adjacent the end wall of the trailer. The lifting means 71 is positioned at one side of the lifting frame 43 adjacent one of the side members of the frame 15. FIG. 9 shows the frame 15 in substantially the center of the trailer, the lifting frame 43 in substantially the center of the frame 15 and the lifting means 71 in substantially the center of the lifting frame 43. In FIG. 10 the frame 15 is shown at substantially the other end of its range of movement extended from the open end of the trailer. The lifting means 43 is positioned at substantially its maximum position at the end of the frame 15 that extends from the trailer. The lifting means 71 is positioned adjacent one side member of the frame 15. From the above figures it is clear that the hoist can be positioned at substantially any position within the trailer to transport or move items within the trailer. The weight transfer apparatus can also extend from the end of the trailer to assist in loading or unloading items from the trailer.

As the frame 15 advances along the second leg 9 of the brackets 5 the frame 15 must be maintained in substantially parallel alignment on the brackets 5. The lifting frame 43 must also be maintained in substantially parallel alignment with the side members 17 of the frame 15 as the lifting frame 43 is moved with respect to the frame 15. It is not always easy to maintain the proper spacing and alignment for the frame 15 and lifting frame 43 as these frames are lifting and positioning items in the trailer. These items can cause loads to be put on the frame 15 and lifting frame 43 that cause these components to vary from their desired location. Accordingly, spacer rollers 35 are positioned on the support members 37 on the side member 17 of the frame 15. The support rollers 35 engage the first leg 7 of the support brackets 5 and act to maintain a consistent and uniform spacing between the side members 17 and the first leg 7 of the bracket 5. Thus, the spacer rollers 35 act to maintain the frame 15 in proper alignment between the side walls 3 of the trailer. Spacer rollers 63 are positioned on support members 65 that are attached to the side members 45 of the lifting frame 43. The spacer rollers 63 engage the tracks 57 positioned on the side members 17 of the frame 15. The spacer roller 63 acts to maintain the lifting frame 43 in proper alignment with respect to the side members 17 of the lifting frame 15.

When the frame 15 extends from the trailer as shown in FIG. 10 extreme loads can be encountered by the frame 15, especially when loading or unloading a heavy object. To help support the frame 15 balance rollers 97 are positioned on flanges 99 on both sides of the frame. The flanges 99 are connected to the side members 17 of the frame 15. The balance rollers 97 are located to engage the surface of the second leg 9 of the brackets 5. The balance rollers 97 engage the surface of the second leg 9 that is opposite to the surface where the track 13 is located and where the driven rollers 23 engage the second leg. The balance rollers 97 are located at the end of the frame 15 where the driven rollers 23 are located. The balance rollers 97 are positioned so that they will engage the second leg 9 of the bracket 5 and provide support for the frame 15 when the other end of the frame 15 is extended from the trailer.

To provide additional support for the frame 15 support rollers 101 are positioned at the open end of the trailer. The support rollers 101 are connected to the side walls of the the trailer and project into the interior of the trailer so that the support rollers are in alignment with the side members 17 of the frame 15. As the frame 15 advances from the end of the trailer the support rollers 101 will engage the side members 17 and provide additional support for the frame 15. As the support rollers 101 are located at the very end of the trailer it will provide additional support for the frame 15.

A guard 103 is positioned around the portion of the portion of the support rollers 101 that does not engage the side members 17 of the frame 15. The guard 103 protects the support rollers 101 from coming into contact with items that are transported in the trailer. The guard 103 terminates at the top to allow a portion of the support rollers 101 to engage the side members 17 of the frame 15. As the side members 17 engage the support rollers 101 the rollers 101 will rotate as the frame advances past the end of the trailer.

The embodiment shown in the application utilizes hydraulic motors to position the frame 15, the lifting frame 43, the lifting means 71 and the hoist 89. These hydraulic motors are supplied with hydraulic fluid by hydraulic lines 105. As the various components of the weight transfer apparatus move with respect to the side walls of the trailer it is necessary to supply a means for maintaining the hydraulic lines in the desired position within allowing the hydraulic lines to be entangled in the weight transfer apparatus or the objects carried in the trailer. To supply connections for the hydraulic lines between the frame 15 and the lifting frame 43 a linkage 109 has been provided. The linkage 109 contains a first hollow member 111 and a second hollow member 115 that are connected together at a pivot connection 117. The first hollow member 111 is pivotally connected to a bracket 113 on the frame 15. The second hollow member 115 is pivotally connected to a bracket 119 on the lifting frame 43. A hydraulic line 121 is positioned in the first and second hollow members of the linkage 109 to supply hydraulic fluid from the frame 15 to the lifting frame 43. As the lifting frame 43 moves with respect to the frame 15 the first and second hollow members of the linkage 109 will pivot at bracket 113 on the frame 15, bracket 119 on the lifting frame 43 and at the pivot connection 117. Therefore, as the lifting frame 43 moves with respect to the frame 15 the linkage 109 can extend or contract in response to the movement of the lifting frame 43. This insures that hydraulic line 121 will be maintained in a position where it does not interfere with the operation of the weight transfer apparatus or become entangled in the object being transported in the trailer. The length of the first and second hollow members can be determined so that the linkage 109 will be capable of extending and contracting to cover the full range of movement for the lifting frame 43.

It is also essential to have means for maintaining the hydraulic lines 105 that are connected to the frame 15 in a location that does not interfere with the operation of the apparatus. The hydraulic lines 105 pass through a support flange 125 and are connected thereto by a clamp 127. The hydraulic lines 105 are also connected to the frame 15 at support bracket 131. From the support bracket 131 the hydraulic lines extend to the various hydraulic motors on the lifting boom. Between the support flange 125 and the support bracket 131 there is a considerable length of hydraulic line and it is desirable to maintain this section of hydraulic line in a location where it does not interfere with the operation of the weight transfer apparatus. Accordingly, the hydraulic lines 105 have been passed around a plurality of pulleys 129 that are positioned in a mounting bracket 135. The mounting bracket 135 is moveably mounted on a track 143 located along one side wall of the trailer. A line 155 extends from a connection bracket 147 on the front or enclosed end of the trailer around a pulley 151 located on the mounting bracket 135 for the pulleys 129, around pulley 157 and pulley 159 located on the front wall of the trailer, around pulley 161 located adjacent the open end of the trailer and connects to bracket 163 which is connected to the frame 15. As the frame 15 is advanced with respect to the sidewalls of the trailer the line 155 will also be advanced. Since the line 155 is connected to the mounting bracket 135 for the pulleys 129 the line will act upon the mounting bracket 135 for the pulleys 129 and control the movement of the mounting bracket and pulleys. As the frame 15 advances from the end of the trailer the line 155 will advance and allow the bracket 135 to advance towards the support flange 125 for the hydraulic lines 105. In this manner hydraulic lines 105 will be allowed to advance with the advancement of the frame 15. If the frame 15 is advanced towards the front or closed end of the trailer the line 155 will advance around pulley 161 and cause the bracket 135 to be advanced towards the front wall of the trailer. In this manner the bracket 135 will act to collect or maintain the hydraulic lines 105 in a position where they do not interfere with the operation of the weight transfer apparatus.

The position of the mounting bracket 135, the line 155, the pulley 157, the pulley 159, the pulley 161 and the length of the hydraulic lines 105 can be coordinated so that the hydraulic lines 105 will always be maintained in an acceptably taut fashion between the support flange 125 and the support bracket 131.

Having described the invention in detail and with reference to the drawings, it is understood that such specifications are given only for the sake of explanation. Various modifications and stustitutes, other than those cited, can be made without departing from the scope of the invention as defined by the following claims.

What I claim is:

1. Material handling apparatus for a trailer having opposed side walls and an open end comprising:

support brackets positioned on said opposed sidewalls of said trailer; a frame moveably positioned on said support brackets, said frame being supported on rollers and said rollers engage said support brackets to allow said frame to be moveably positioned on said support brackets, said frame being capable of moving along said support brackets in a direction substantially parallel to said sidewalls of said trailer, said frame being disposed to allow said frame to extend out said open end of said trailer;

balance rollers positioned on one end of said frame, said balance rollers engaging said support brackets opposite said rollers upon which the frame is supported, said balance rollers engaging said support brackets to balance said frame when said frame extends from said open end of said trailer, said balance rollers located on said end of said frame that does not extend out of said open end of said trailer;

a support roller positioned at each end of said support brackets adjacent said open end of said trailer, said support rollers being disposed to engage and support said frame when said frame extends out said open end of said trailer;

a lifting frame moveably positioned on said frame, said lifting frame being capable of moving along said frame in a direction substantially parallel to said sidewalls of said trailer, said lifting frame being capable of moving along substantially the entire length of said frame;

a lifting means moveably positioned on said lifting frame, said lifting means being capable of moving in a direction substantially parallel to and substantially perpendicular to said opposed sidewalls of said trailer, said lifting means being capable of lifting objects that are transported in said trailer whereby said objects can be lifted and said lifting means, lifting frame and frame can be moved with respect to said trailer for loading and unloading said objects.

2. The apparatus of claim 1 wherein at least said rollers at one end of said frame are mounted on a drive shaft.

3. The apparatus of claim 2 wherein a reversible motor is operatively connected to said drive shaft for rotating said drive shaft and rollers to position said frame with respect to said support brackets.

4. The apparatus of claim 3 wherein longitudinal tracks are positioned on said support brackets.

5. The apparatus of claim 4 wherein sprockets are mounted on each end of said drive shaft, said sprockets being positioned to engage said longitudinal tracks on said support brackets, said sprockets acting to position said frame with respect to said support brackets.

6. The apparatus of claim 1 wherein said frame has side members positioned substantially parallel to said support brackets and end members positioned substantially perpendicular to said support bracket.

7. The apparatus of claim 6 wherein said lifting frame has side members positioned substantially parallel to said support brackets and end members positioned substantially perpendicular to said support brackets.

8. The apparatus of claim 7 wherein said lifting frame is supported on rollers connected to said side members of said lifting frame, said rollers being disposed to engage said side members of said frame.

9. The apparatus of claim 8 wherein at least said rollers at one end of said lifting frame are mounted on a drive shaft.

10. The apparatus of claim 9 wherein a reversible motor is operatively connected to said drive shaft for rotating said drive shaft and rollers to position said frame with respect to said side members of said frame.

11. The apparatus of claim 10 wherein longitudinal tracks are positioned on said side members of said frame.

12. The apparatus of claim 1 wherein sprockets are mounted on each end of said drive shaft, said sprockets being positioned to engage said longitudinal tracks on said side members of said frame, said sprockets acting to position said frame with respect to said side members of said frame.

13. The apparatus of claim 12 wherein said lifting means includes a hoist moveably positioned on said lifting frame.

14. The apparatus of claim 13 wherein said hoist is positioned on a carriage having end members positioned substantially perpendicular to said support brackets and side members positioned substantially parallel to said support brackets.

15. The apparatus of claim 14 wherein said carriage for said hoist is supported on rollers connected to said side members of said carriage, said rollers being disposed to engage said end members of said lifting frame.

16. The apparatus of claim 15 wherein at least said rollers at one end of said carriage are mounted on a drive shaft.

17. The apparatus of claim 16 wherein a reversible motor is operatively connected to said drive shaft for rotating said drive shaft and rollers to position said carriage with respect to said lifting frame.

18. The apparatus of claim 17 wherein longitudinal tracks are positioned on said end members of said lifting frame.

19. The apparatus of claim 18 wherein sprockets are mounted on each end of said drive shaft, said sprockets being position to engage said longitudinal tracks on said end members of said lifting frame, said sprockets acting to position said carriage and hoist with respect to said end members of said end members of said lifting frame.

20. The apparatus of claim 1 wherein said frame is moveably positioned by means of a hydraulic motor.

21. The apparatus of claim 20 wherein a hydraulic line is connected to one end of said sidewalls of said trailer and to said moveable frame.

22. The apparatus of claim 21 wherein a moveable bracket is positioned on said sidewall of said trailer and said hydraulic line passes around said bracket, said bracket being operatively connected to said frame whereby said bracket moves in response to movement of said frame whereby said hydraulic line is maintained taut and adjacent said sidewall of said trailer.

23. The apparatus of claim 22 wherein at least one pulley is positioned in said moveable bracket and said hydraulic line passes around said pulley.

24. The apparatus of claim 23 wherein a line having one end connected to said trailer, the other end connected to said moveable frame and passing around said moveable bracket is used to operatively connect said bracket to said frame.

25. The apparatus of claim 21 wherein said hydraulic line is connected between said frame and said lifting frame by means of a pivotal linkage.

26. The apparatus of claim 25 wherein said linkage contains a first hollow member pivotally connected to said frame, a second hollow member pivotally connected to said lifting frame, said first and second hollow members being pivotally connected together at one end.

27. The apparatus of claim 21 wherein said hydraulic line passes through said first and second hollow members of said linkage.

* * * * *